(No Model.) 2 Sheets—Sheet 1.
C. D. CHATTERTON.
RUNNER FOR BICYCLE WHEELS.
No. 565,067. Patented Aug. 4, 1896.
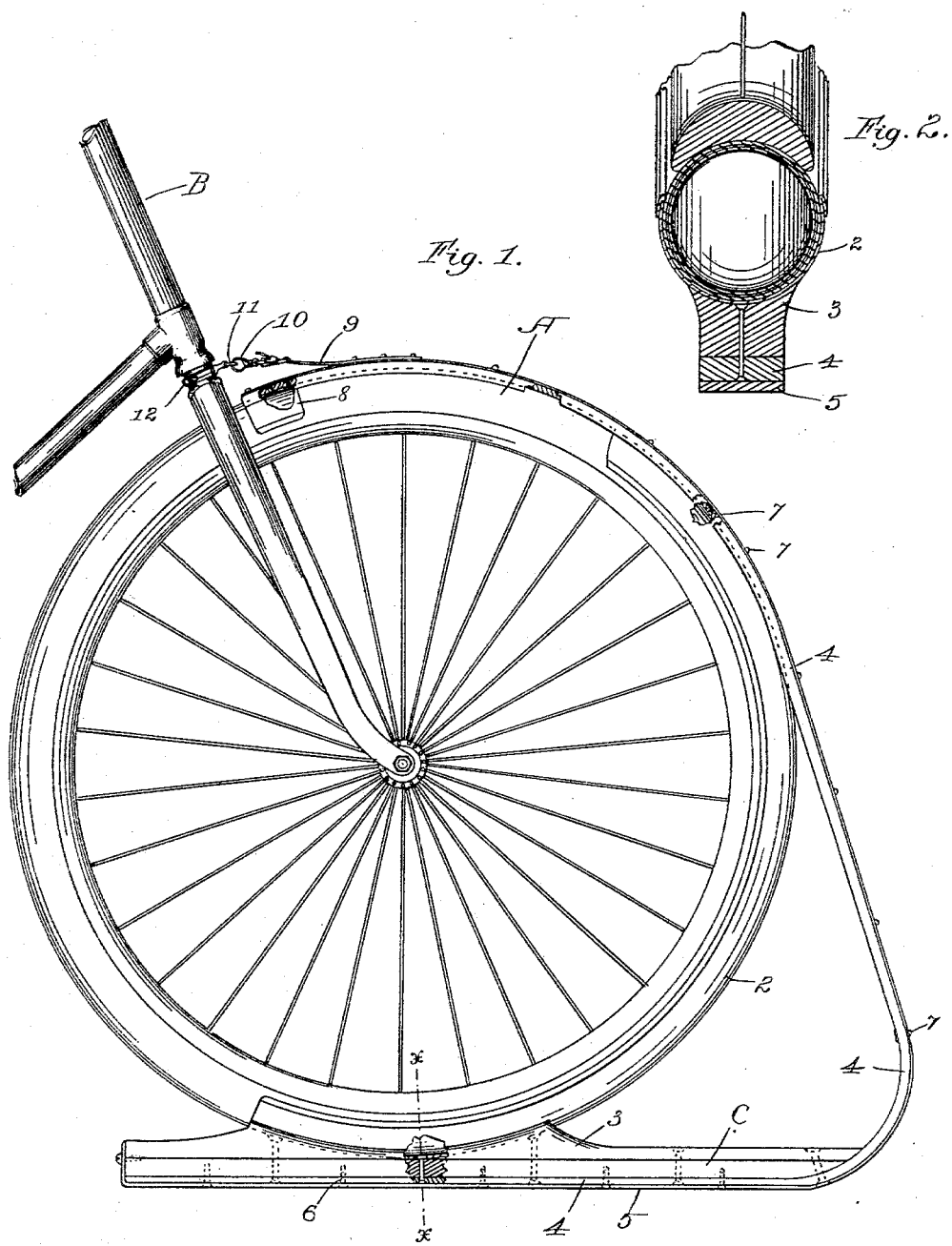
Witnesses:
F. L. Bradbury
H. S. Johnson
Inventor:
Clarence D. Chatterton.
per: T. D. Merwin
Attorney.

(No Model.) 2 Sheets—Sheet 2.
C. D. CHATTERTON.
RUNNER FOR BICYCLE WHEELS.
No. 565,067. Patented Aug. 4, 1896.
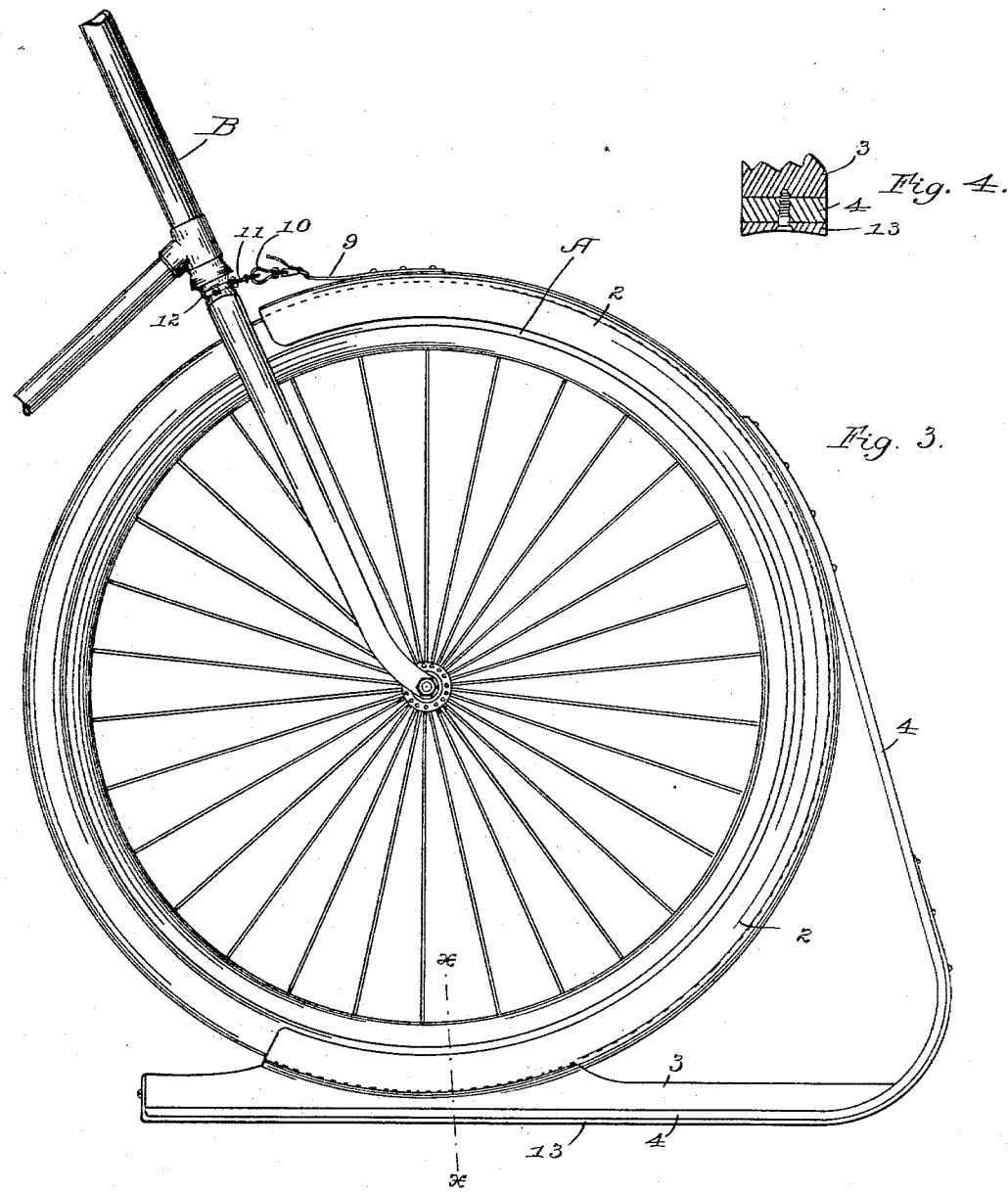
Witnesses
F. T. Bradbury.
H. S. Johnson.
Inventor:
Clarence D. Chatterton
per: 
Attorney.

UNITED STATES PATENT OFFICE.

CLARENCE D. CHATTERTON, OF ST. PAUL, MINNESOTA.

RUNNER FOR BICYCLE-WHEELS.

SPECIFICATION forming part of Letters Patent No. 565,067, dated August 4, 1896.

Application filed March 11, 1896. Serial No. 582,718. (No model.)

*To all whom it may concern:*

Be it known that I, CLARENCE D. CHATTERTON, of St. Paul, Ramsey county, Minnesota, have invented certain Improvements in Bicycle-Runners, of which the following is a specification.

My invention relates to improvements in bicycles and similar vehicles, its object being to provide a runner or skate which will grip the tire of the wheel and be retained in place without the use of any extra securing attachments.

To this end my invention consists in rigidly connecting to the runner a concave rim fitting to the tire of the wheel, and preferably somewhat more than a semicircle, so as to firmly grip and be held in place upon the tire. The runner preferably extends rearwardly over the top of the wheel beyond the rim, so as to grip the wheel. The device is thus held in place upon the wheel by means of the resiliency of the tire and by its own clamping action, so that additional securing means are unnecessary.

My invention further consists in the specific features of construction hereinafter particularly described and claimed.

In the accompanying drawings, forming a part of this specification, Figure 1 is a side view of the front wheel of a bicycle shown fitted with my invention. Fig. 2 is a cross-section taken on line $x\ x$ of Fig. 1. Fig. 3 is a side view of a front bicycle-wheel shown fitted with a modified form of my invention, and Fig. 4 is a partial detail taken on line $x\ x$ of Fig. 3.

In the drawings, A represents the front wheel of an ordinary bicycle, B a portion of the frame, and C my improved device fitted to said wheel.

2 represents the concave rim, which is adapted to clamp the tire of the wheel, this rim being preferably somewhat more than a semicircle, so as to give an inclosing or gripping action upon the tire.

The rim 2 is seated upon the wooden body or saddle 3, to the bottom of which is secured the runner portion 4, which in turn is provided with a shoe 5, secured thereto by means of the screws 6. The runner portion 4, as shown in Fig. 1, extends upward and is attached to the front of the rim 2 by means of rivets 7, extending over the top of the wheel to the rear of the center, where it is provided with a clamp 8, adapted to project down over and engage the pneumatic tire.

Attached to the top of the runner is the strap 9, provided with a snap 10, adapted to hook into the eye 11 of the strap 12 upon the frame B. As the figure shows, the rim 2 at the bottom extends to the rear of the center of the wheel, and the runner portion 4 extends to the rear of the center of the top of the wheel, clamping the same and holding the device firmly in place upon the wheel. The rim 2 is also of slightly less cross-section than the diameter of the tire, so as to give a further clamping action, and the end of the runner portion 4 is provided with the clamp 8 to further hold the same in place.

It will thus be evident that the runner is securely held upon the wheel without the use of any additional securing attachments. The strap 9 is used as an extra means of precaution to keep the wheel with its attachment from turning when lifted from the ground.

In Fig. 3 is shown a modification of my invention. In this form the rim 2 extends at the top to the rear of the center of the wheel, and the end of the runner portion 4 is attached to the front of the rim. Otherwise the construction corresponds with that shown in Fig. 1, with the exception that in this form I show the shoe 13 hollow ground to adapt it for use upon ice. In this construction the rim 2 grips the top of the wheel, instead of the runner portion 4.

In the use of my invention, the same is easily placed upon the tire, springing sufficiently to allow the ends of the rim at the top and bottom to pass to the rear of the center of the wheel, the resiliency of the tire being sufficient to allow the rim to be forced in place upon it. When in place, the clamping action is so strong that the attachment is held firmly in place against all ordinary jars and usage without the necessity of any additional securing attachments, the strap 9 only being used as above described as an extra precaution to prevent the turning of the front wheel together with the runner.

I claim—

1. The combination with a bicycle-wheel, of the rim fitted thereto and held in place by the resiliency of the tire, and the runner attached to said rim.

2. The combination with a bicycle-wheel, of the runner fitted to the tire thereof, and with its ends projecting to the rear of the bottom of the wheel, and the top of the wheel respectively, so as to be held in place by its own gripping action.

3. In combination with a bicycle, a skate or runner therefor, upon which the tire is seated and held in place by the resiliency thereof.

4. The combination with a bicycle-wheel, of the runner, the rim rigidly connected to said runner adapted to be fitted to the tire, and held in place by the resiliency thereof, and the means connecting the runner and bicycle-frame to prevent turning of the wheel.

In testimony whereof I affix my signature in presence of two witnesses.

CLARENCE D. CHATTERTON.

Witnesses:
H. S. JOHNSON,
MINNIE L. THAUWALD.